(12) United States Patent
Kato

(10) Patent No.: US 8,447,514 B2
(45) Date of Patent: May 21, 2013

(54) MOBILE COMMUNICATION TERMINAL

(75) Inventor: Takayuki Kato, Osaka (JP)

(73) Assignee: KYOCERA Corporation, Kyoto (JP)

( * ) Notice: Subject to any disclaimer, the term of this patent is extended or adjusted under 35 U.S.C. 154(b) by 190 days.

(21) Appl. No.: 12/811,060

(22) PCT Filed: Dec. 25, 2008

(86) PCT No.: PCT/JP2008/073954
§ 371 (c)(1),
(2), (4) Date: Jun. 28, 2010

(87) PCT Pub. No.: WO2009/084727
PCT Pub. Date: Jul. 9, 2009

(65) Prior Publication Data
US 2010/0292924 A1    Nov. 18, 2010

(30) Foreign Application Priority Data
Dec. 28, 2007    (JP) .................................. 2007-339394

(51) Int. Cl.
*G01C 21/00*    (2006.01)
*G01C 21/34*    (2006.01)

(52) U.S. Cl.
USPC ........... 701/431; 701/442; 701/428; 701/429; 340/815.45; 340/988; 455/412.2; 455/415

(58) Field of Classification Search ................... 701/428, 701/442, 445; 455/412.2; 340/815.45
See application file for complete search history.

(56) References Cited

U.S. PATENT DOCUMENTS

| | | | |
|---|---|---|---|
| 6,850,781 B2* | 2/2005 | Goto | 455/566 |
| 7,161,496 B2* | 1/2007 | Bocking et al. | 340/815.45 |
| 7,212,812 B2* | 5/2007 | Park | 455/415 |
| 2008/0068165 A1* | 3/2008 | DeWitt et al. | 340/572.1 |

FOREIGN PATENT DOCUMENTS

| | | |
|---|---|---|
| JP | 2007-280583 | 10/1995 |
| JP | H07-280583 A | 10/1995 |
| JP | 2002-168647 | 6/2002 |
| JP | 2002-296066 | 10/2002 |

(Continued)

OTHER PUBLICATIONS

International Search Report and Written Opinion dated Mar. 31, 2009 issued by the Japanese Patent Office for International Application No. PCT/JP2008/073954.

(Continued)

*Primary Examiner* — Thomas Tarcza
*Assistant Examiner* — Tyler J Lee
(74) *Attorney, Agent, or Firm* — Procopio, Cory, Hargreaves & Savitch LLP

(57) ABSTRACT

A mobile communication terminal 10 has a navigation function to perform a route guidance from a present location to a destination by utilizing a network 100 and a GPS signal. A geomagnetism sensor 46, a direction detecting circuit 44 and a gyro sensor 48 detects a traveling direction of the mobile communication terminal 10 (user). The CPU 20 determines whether or not the traveling direction and a direction of the route designated by the navigation function are coincident with each other by the processing in a step S7. Then, if the traveling direction and the direction of the route designated by the navigation function are not coincident with each other, the LED 38 notifies what direction the user has to go by emitting light in any one of red, yellow and orange.

7 Claims, 11 Drawing Sheets

FOREIGN PATENT DOCUMENTS

| | | | |
|---|---|---|---|
| JP | 2002296066 A | * | 10/2002 |
| JP | 2004-028854 A | | 1/2004 |
| JP | 2004-312475 | | 11/2004 |
| JP | 2007-189722 | | 7/2007 |
| JP | 2007189722 A | * | 7/2007 |

OTHER PUBLICATIONS

Notice of Grounds for Rejection dated Jun. 28, 2011 issued for counterpart Japanese Application No. 2007-339394.

* cited by examiner

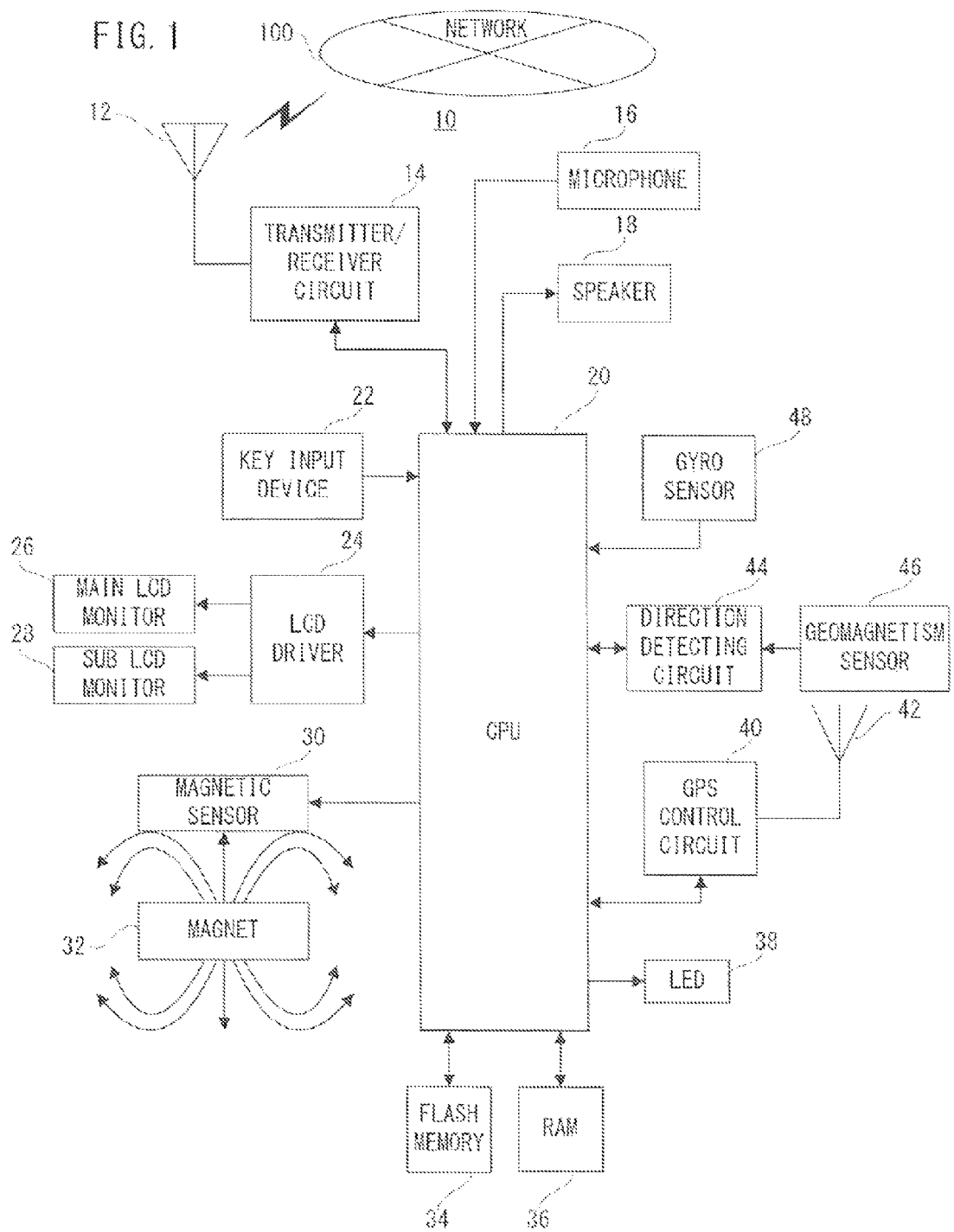

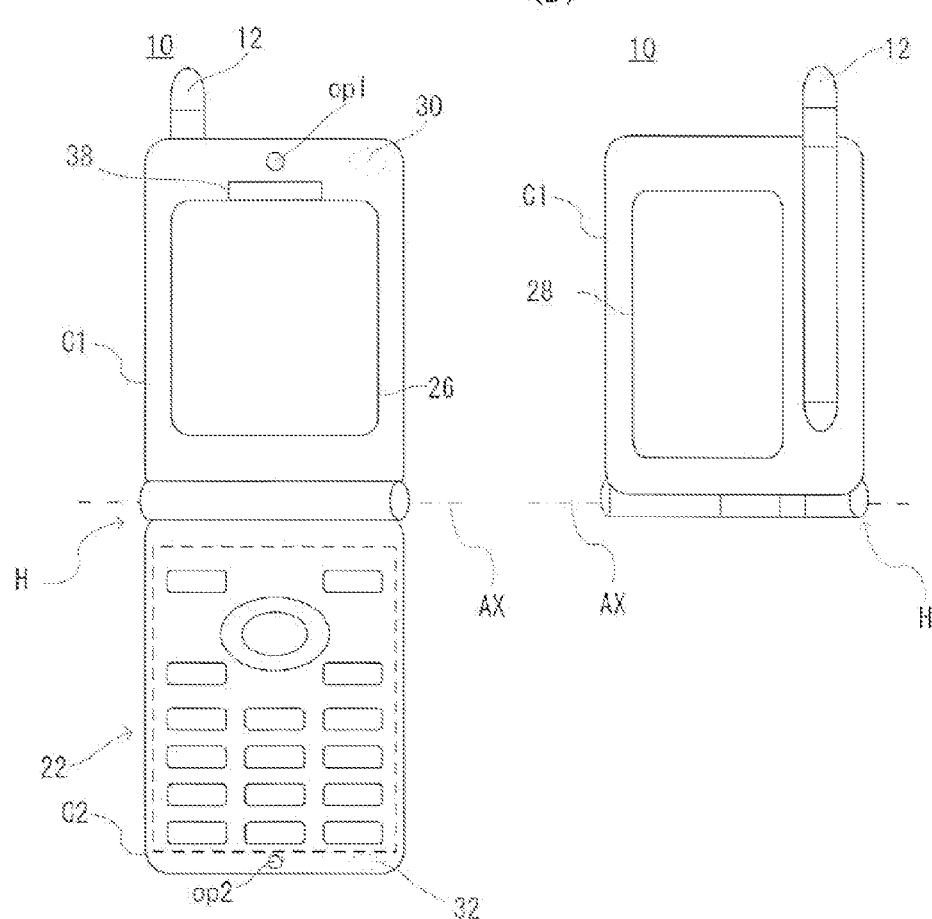

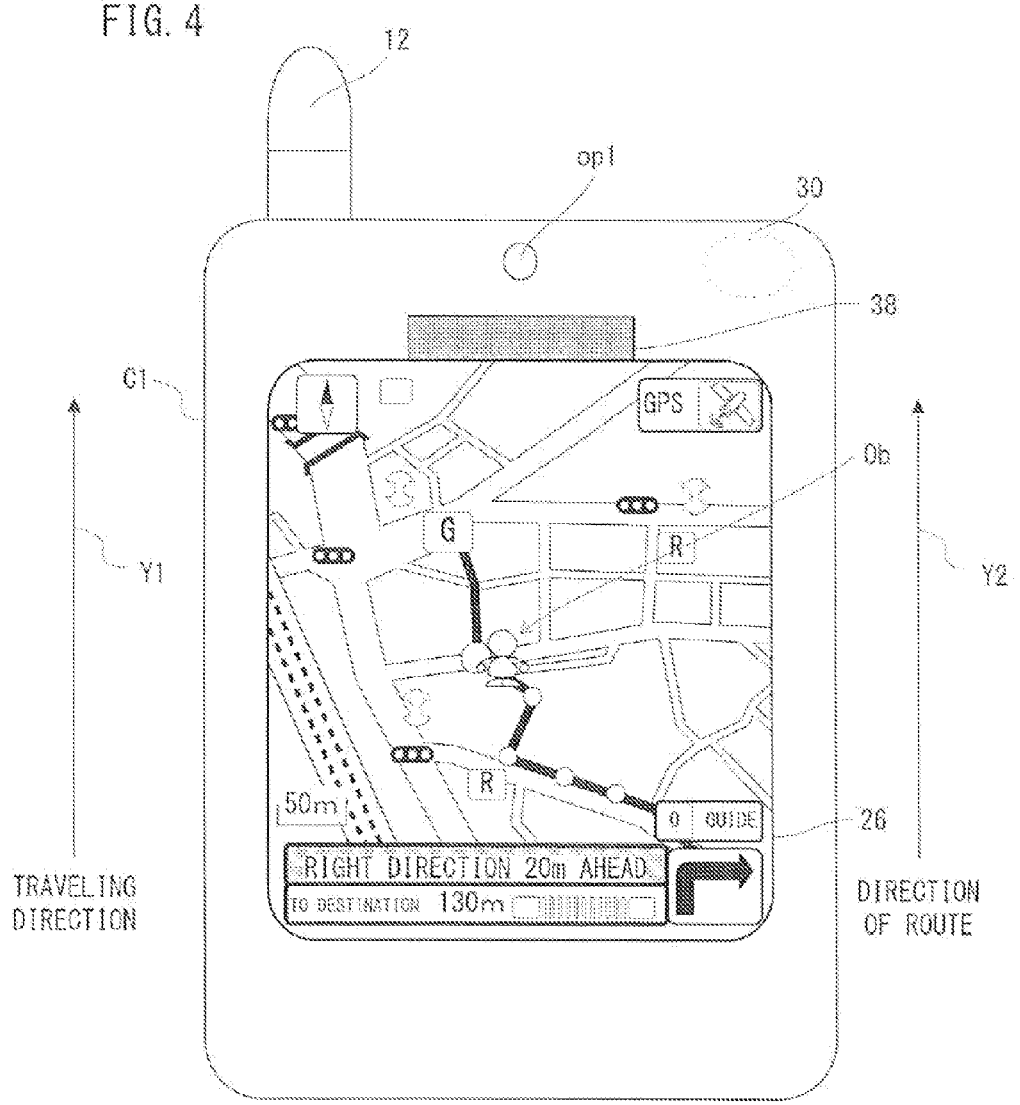

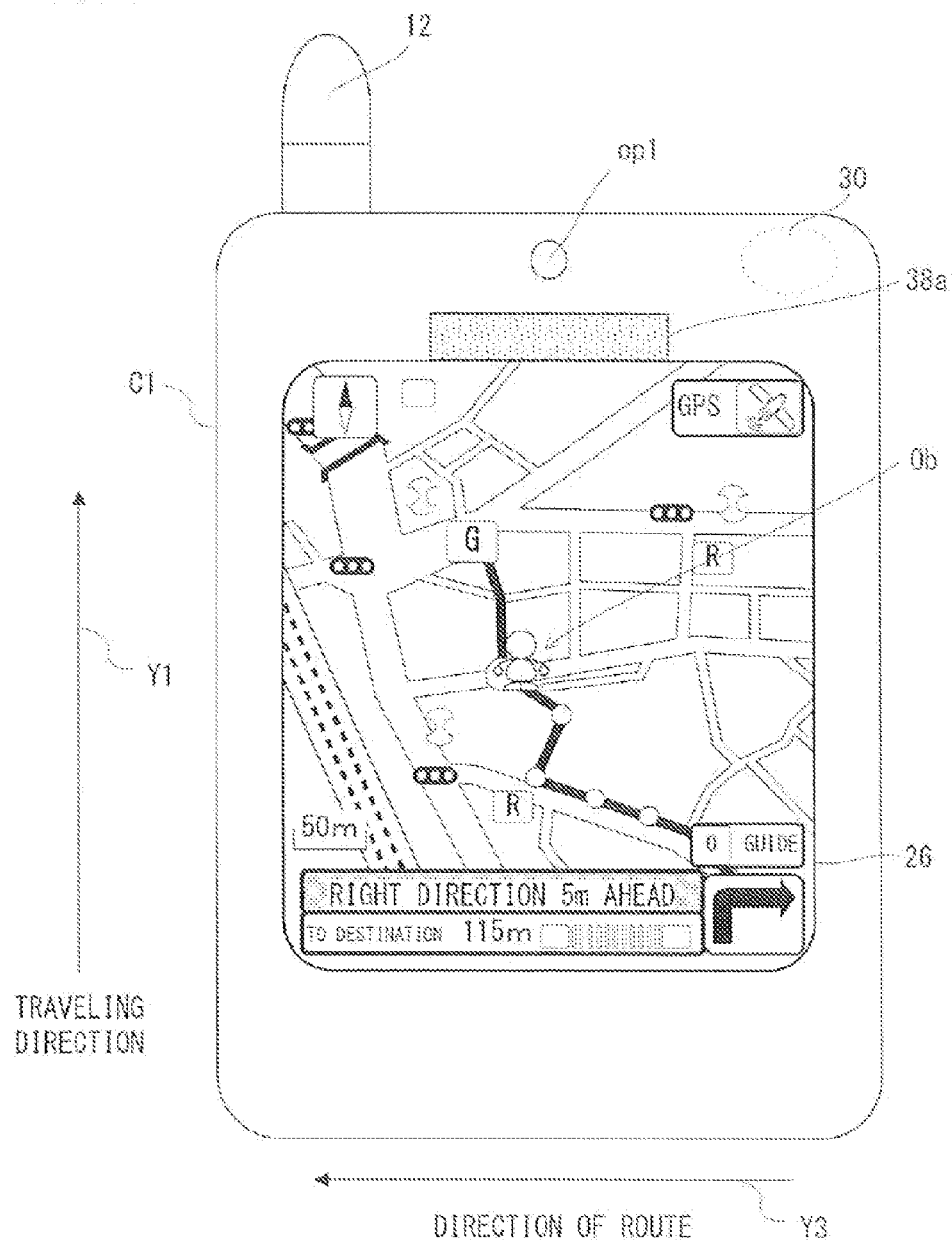

FIG. 6 (A) (B)
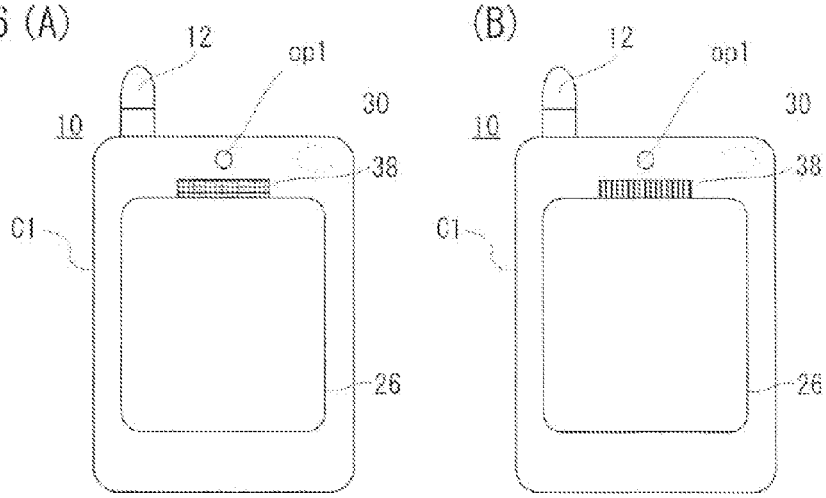
FIG. 7
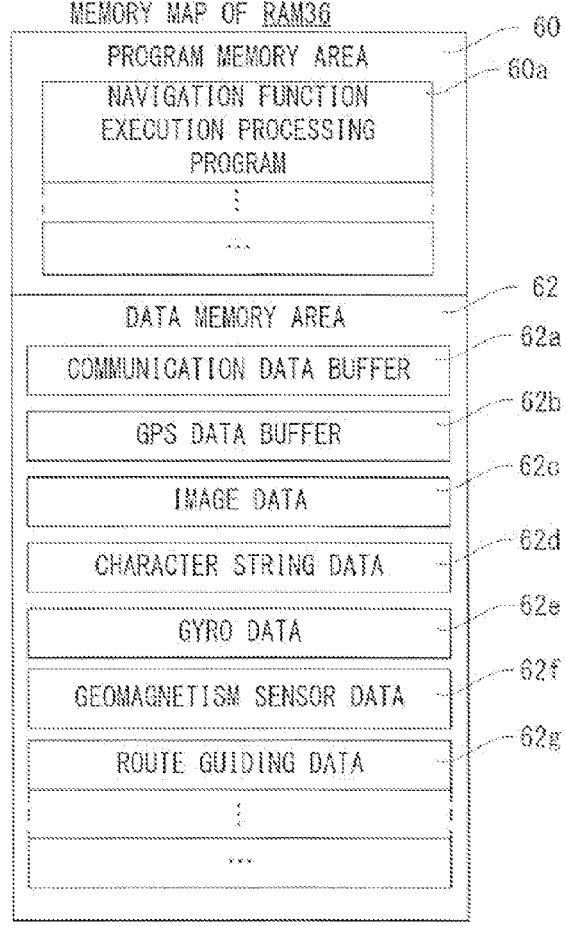

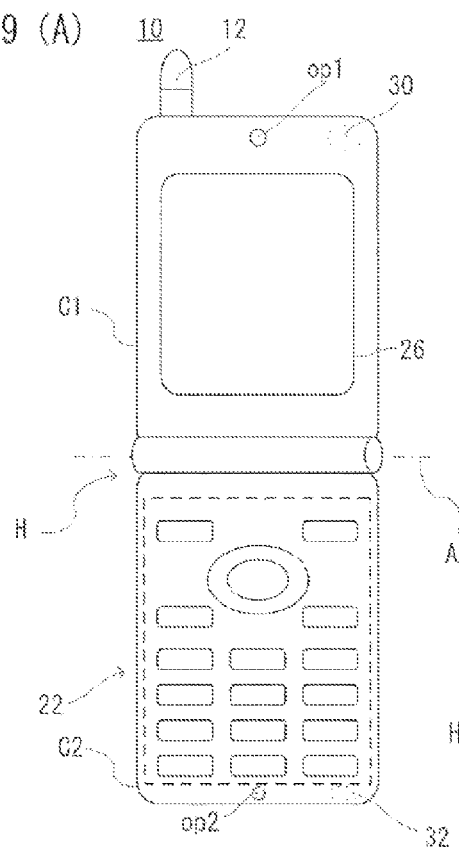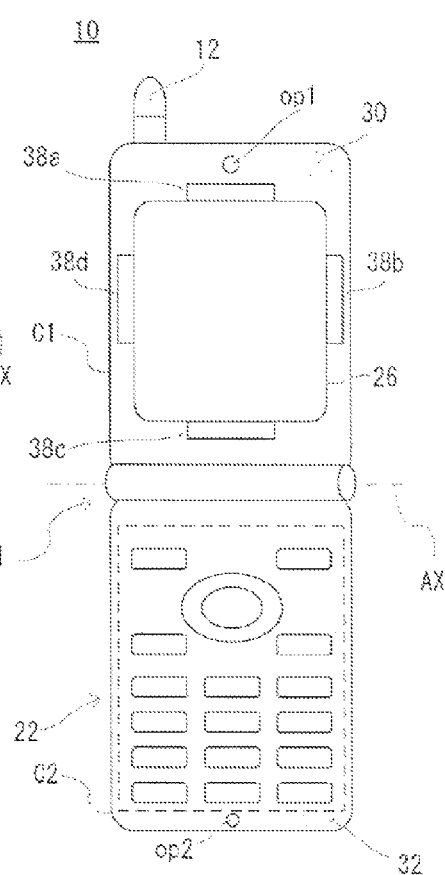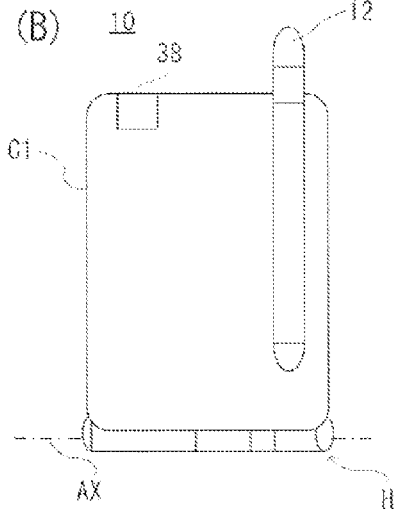

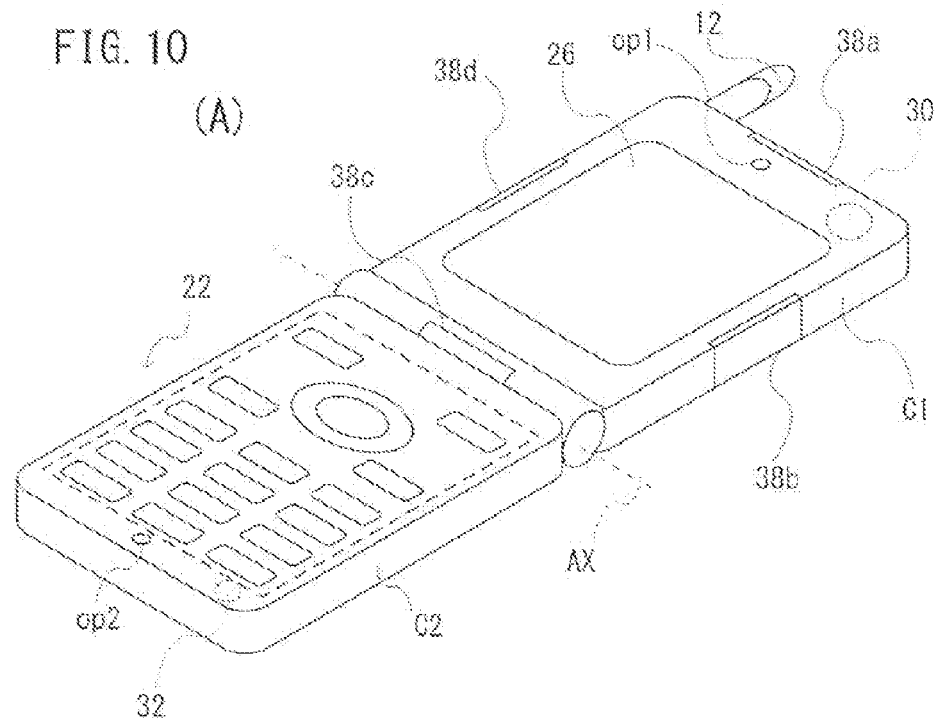
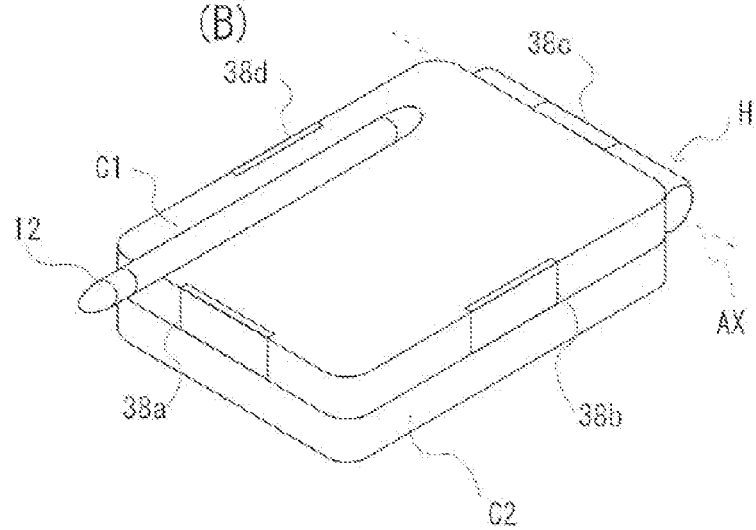
FIG. 10

US 8,447,514 B2

MOBILE COMMUNICATION TERMINAL

TECHNICAL FIELD

The present invention relates to a mobile communication terminal. More specifically, the present invention relates to a mobile communication terminal having a navigation function for route guidance.

BACKGROUND ART

In one example of an apparatus of such a kind, a vehicle navigation apparatus attached to a handle of an autobicycle is provided with seven display elements and three display elements which are respectively spaced uniformly on the same circumference at the forward and at the backward of a traveling direction with a central display portion surrounded. By arranging such display elements, by the seven display elements arranged at the forward of the traveling direction, the direction of a target point can be perceived with high accuracy to thereby accurately correct the traveling direction as to the forward of the traveling direction. Furthermore, by the three display elements arranged at the backward of the traveling direction, an approximate direction is indicated as an alarm instruction for prompting a user to invert when the target point goes by as to the backward of the traveling direction.

Additionally, in another example, the navigation apparatus attached to the vehicle, etc. is provided with a display portion for displaying navigation information of the vehicle, a controller portion for calculating a current position of the vehicle with respect to the route toward a destination set in advance to output a designation signal of a rotating direction of the vehicle in advance, and a pair of light-emitting members for selectively emitting a light in correspondence with the designation signal of the rotating direction output form the controller portion. That is, the pair of light-emitting members for selectively emitting light, when the vehicle has to turn to the left or the right after a constant time period, notifies the user of an instruction of prompting the user to turn to the left or the right by its own light-emission.

However, in the former, even if the user proceeds along an erroneous route which does not lead to the target point, the user is never notified that he or she proceeds along the erroneous route. That is, the user can proceed to the direction of the target point, but if the user proceeds along the route which does not lead to the target point, the user cannot notify that the proceeding route is erroneous.

Furthermore, in the latter, if the user did not turn to the left or the right according to an instruction notified in advance, the user is never notified that he or she did not turn to the left or the right as instructed. For example, if turning to the left is notified in advance, when there are two successive intersections, the user cannot accurately know which intersection her or she has to turn to the left, and he or she may turn to the left at the erroneous intersection. Then, the user cannot notify that he or she turns to the left at an erroneous intersection.

SUMMARY OF THE INVENTION

Therefore, it is a primary object of the present invention to provide a novel mobile communication terminal.

Another object of the present invention is to provide a mobile communication terminal capable of causing a user to easily perceive whether his or her own traveling direction is correct.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a mobile communication terminal having a navigation function to perform route guidance from a present location to a destination by obtaining information of the present location, and comprises a traveling direction detector which detects a traveling direction of the mobile communication terminal; a determiner which determines whether or not the traveling direction detected by the traveling direction detector is coincident with a direction of a route designated by the navigation function; and a notifier which notifies by a visual effect at least one of whether or not the traveling direction detected by the traveling direction detector is correct on the basis of a determination result by the determiner.

In the first invention, the mobile communication terminal (10) has a navigation function to perform route guidance from a present location to a destination by obtaining information of the present location. A traveling direction detector (20, 44, 46, 48, S5) detects a traveling direction of the mobile communication terminal. A determiner (20, S11) determines whether or not the traveling direction detected by the traveling direction detector is coincident with a direction of a route designated by the navigation function. A notifier (20, 38, S13, S15, S17, S31, S33, S35, S37, S41) notifies by a visual effect at least one of whether or not the traveling direction detected by the traveling direction detector is correct on the basis of a determination result by the determiner by a visual effect. Accordingly, the user confirms whether or not the direction of the route designated by the navigation function and the traveling direction are coincident with each other.

According to the first invention, the user can determines whether or not the direction of the route designated by the navigation function and the traveling direction are coincident with each other on the basis of the visual effect notified by the notifier. Thus, the user can easily perceive whether his or her own traveling direction is correct.

A second invention is according to the first invention, and the notifier includes an error notifier which notifies that the traveling direction is wrong by a color when the determiner determines not to be coincident.

In the second invention, en error notifier (20, 38, S15, S17, S33, S41) notifies that the traveling direction is wrong by a color when the determiner determines not to be coincident.

For example, the error notifier notifies that the determiner determines not to be coincident by a color different from the color when the determiner determines to be coincident.

According to the second invention, the error notifier notifies that the traveling direction is wrong by a color when the determiner determines not to be coincident. Thus, the user can easily perceive whether or not his or her own traveling direction is correct.

A third invention is according to the second invention, and the notifier further includes a direction notifier which notifies a direction to go by a color when the determiner determines not to be coincident.

In the third invention, a direction notifier (20, 38, S15, S17, S35, S37) notifies a direction to go by a color when the determiner determines not to be coincident. Thus, the user can perceive the direction to go on the basis of the color notified by the direction notifier.

According to the third invention, the direction notifier can notify the user of the direction to go by a color. Thus, the user can easily perceive a correct traveling direction even when proceeding to an erroneous traveling direction.

A fourth invention is according to the third invention, and the mobile communication terminal further comprises a route determiner which determines whether or not the present location is off the route designated by the navigation function, wherein the direction notifier includes a route existing direction notifier which notifies a direction in which the route exists designated by the navigation function when the route determiner determines to be off the route designated by the navigation function.

In the fourth invention, a route determiner (20, S9) determines whether or not to be off the route designated by the navigation function. A route existing direction notifier (20, 38, S17, S37) notifies a direction in which the route exists designated by the navigation function when the route determiner determines to be off the route designated by the navigation function.

According to the fourth invention, even if the user is off the route designated by the navigation function, the route existing direction notifier can notify a direction to return to the route. Thus, the user can easily perceive the correct traveling direction.

A fifth invention is according to the fourth invention, and the route existing direction notifier includes a route existing direction calculator which calculates a direction in which the route exists designated by the navigation function from the present location and the traveling direction detected by the traveling direction detector.

In the fifth invention, the direction of the route designated by navigation function changes according to the traveling direction, and therefore, a route existing direction calculator (20, S17, S37) calculates a direction in which the route exists designated by the navigation function from the present location and the traveling direction detected by the traveling direction detector.

According to the fifth invention, the route existing direction calculator calculates the direction in which the route exists, and thus, even if the user is off the route designated by the navigation function, he or she can perceive the direction of the route.

A sixth invention is according to the fourth or the fifth invention, and the direction notifier further includes a route direction notifier which notifies the direction of the route designated by the navigation function when the route determiner determines not to be off the route designated by the navigation function.

In the sixth invention, the route direction notifier (20, 38, S15, S35) notifies the direction of the route designated by the navigation function when the route determiner determines not to be off the route designated by the navigation function.

According to the sixth invention, if the user is on the route designated by the navigation function, the route direction notifier can notify the direction of the route. That is, the user can easily perceive the correct traveling direction.

A seventh invention is according to any one of the third to sixth inventions, and the notifier further includes one light-emitting element capable of lighting up in a plurality of colors, and the error notifier notifies that the traveling direction detected by the traveling direction detector is wrong by making the light-emitting element light up in a the specific color out of the plurality of colors, and the direction notifier notifies the direction to go by making the light-emitting element light up in a color other than the specific color out of the plurality of colors.

In the seventh invention, one light-emitting element (38) can emit light by a plurality of colors. Then, the error notifier notifies that the traveling direction detected by the traveling direction detector is wrong by making the light-emitting element light up in a specific color out of the plurality of colors, and the direction notifier notifies the direction to go by making the light-emitting element light up in a color other than the specific color out of the plurality of colors. For example, the error notifier notifies that the traveling direction is wrong by making the light-emitting element light up. Furthermore, the direction notifier notifies the direction (reverse, left, right) to go by a color (red, orange and yellow) of the emitted light.

According to the seventh invention, the user can easily confirm whether his or her own traveling direction is correct depending on the color of light emitted by the light-emitting element.

An eighth invention is according to any one of the third to sixth inventions, and the notifier further includes a plurality of light-emitting elements which are provided at positions different from each other, and the error notifier notifies whether or not the traveling direction detected by the traveling direction detector is correct by making a specific light-emitting element light up out of the plurality of light-emitting elements, and the direction notifier notifies the direction to go by making a light-emitting element other than the specific light-emitting element out of the plurality of light-emitting elements light up.

In the eighth invention, a plurality of light-emitting elements (38a, 38b, 38c, 38d) are provided at positions different from each other. Then, the error notifier notifies whether or not the traveling direction detected by the traveling direction detector is correct by making a specific light-emitting element light up out of the plurality of light-emitting elements, and the direction notifier notifies the direction to go by making a light-emitting element other than the specific light-emitting element out of the plurality of light-emitting elements light up. For example, the error notifier notifies that the traveling direction is wrong by making the light-emitting element provided at the front of and the furthest from the user light up in red. Furthermore, the direction notifier notifies the direction to go (reverse, left, and right) by making the light-emitting element provided at other positions (at the front of and the closest to the user, at the left front of the user and at the right front of the user) light up in green.

According to the eighth invention, the user can easily confirm whether his or her own traveling direction is correct depending on the position where each of the light-emitting element lights up.

A ninth invention is a storage medium readably storing a notifying program in a mobile communication terminal having a navigation function to perform route guidance from a present location to a destination by obtaining information of the present location, and the notifying program causes the computer to execute: a traveling direction detecting step which detects a traveling direction of the mobile communication terminal; a determining step which determines whether or not the traveling direction detected by the traveling direction detector is coincident with a direction of a route designated by the navigation function; and a notifying step which notifies by a visual effect at least one of whether or not the traveling direction detected by the traveling direction detector is correct on the basis of a determination result by the determiner.

In the ninth invention as well, similar to the first invention, the user can easily perceive whether his or her own traveling direction is correct.

A tenth invention is a notifying method in a mobile communication terminal having a navigation function to perform route guidance from a present location to a destination by obtaining information of the present location, including steps of: a traveling direction detecting step which detects a traveling direction of the mobile communication terminal; a determining step which determines whether or not the traveling direction detected by the traveling direction detector is coincident with a direction of a route designated by the navigation function; and a notifying step which notifies by a visual effect at least one of whether or not the traveling direction detected by the traveling direction detector is correct on the basis of a determination result by the determiner.

In the tenth invention as well, similar to the first invention, the user can easily confirm whether his or her own traveling direction is correct.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a mobile communication terminal as one embodiment showing first embodiment of the present invention.

FIG. 2 is a schematic diagram showing the first embodiment of the present invention, FIG. 2(A) is a front view in an open position, and FIG. 2(B) is a rear view showing a closed position.

FIG. 3 is an illustrative view showing a corresponding relationship between colors of an LED shown in FIG. 1 and patterns illustrated in the drawings.

FIG. 4 is an illustrative view showing a map display including route guiding information from a present location to a certain destination on a main LCD monitor shown in the first embodiment of the present invention and one example of the color indicated by the LED.

FIG. 5 is an illustrative view showing a map display including route guiding information from a present location to a certain destination on the main LCD monitor shown in the first embodiment of the present invention and another example of the color indicated by the LED.

FIG. 6(A) is an illustrative view showing a still another example of the color indicated by the LED shown in the first embodiment of the present invention, and FIG. 6(B) is an illustrative view showing a further example of the color indicated by the LED.

FIG. 7 is an illustrative view showing one example of a memory map of a RAM shown in FIG. 1.

FIG. 9 is a schematic diagram showing a second embodiment of the present invention, FIG. 9(A) is a front view in an open position, and FIG. 9(B) is a rear view in a closed position.

FIG. 10 is a schematic diagram showing a third embodiment of the present invention, FIG. 10(A) is a perspective view in an open position, and FIG. 10(B) is a perspective view in a closed position.

FIG. 14 is a front view in an open position of a fourth embodiment of the present invention.

BEST MODE FOR PRACTICING THE INVENTION

First Embodiment

Figure 8:
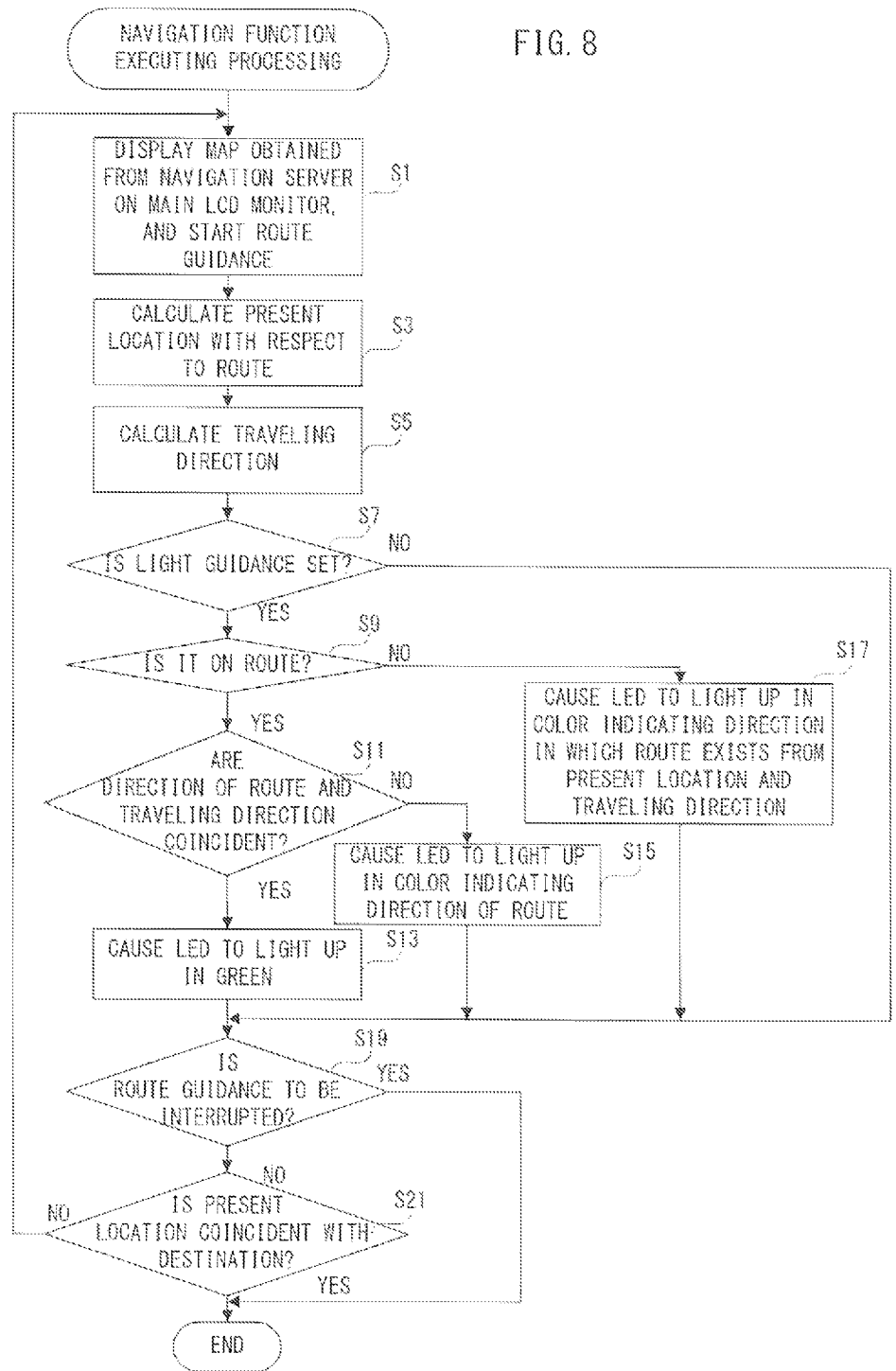
FIG. 8 is a flowchart showing navigation function executing processing to be executed by a CPU of the mobile communication terminal shown in FIG. 1.

Referring to FIG. 1, a mobile communication terminal 10 includes a key input device 22. When a call-out operation is performed by the key input device 22, a CPU 20 controls a transmitter/receiver circuit 14 corresponding to a CDMA system to output a calling signal. The output calling signal is sent from an antenna 12, and sent to a mobile communication network including base stations. Then, when an intended party makes a response operation, a communication allowable state is established.

When a conversation end operation is performed by the key input device 22 after a transition to a communication allowable state, the CPU (may be called as a processor or a computer) 20 controls the transmitter/receiver circuit 14 to send a conversation end signal to the mobile communication network including the base stations. After transmission of the conversation end signal, the CPU 20 ends the conversation processing. Also, in a case that a conversation end signal is received from the intended party, the CPU 20 ends the conversation processing. Furthermore, in a case that a conversation end signal is received from the mobile communication network not from the intended party as well, the CPU 20 ends the conversation processing.

When a calling signal from the intended party is received by the antenna 12 in a state that the entire system is activated, the transmitter/receiver 14 notifies an incoming call to the CPU 20. The CPU 20 outputs calling source information described in the incoming call notification to a main LCD monitor 26 or a sub LCD monitor 28, and outputs an incoming call tone from an incoming call notifying speaker not shown. When a response operation is performed by the key input device 22, a communication allowable state is established.

In the communication allowable state, following processing is executed. A modulated audio signal (high frequency signal) sent from the intended party is received by the antenna 12. The received modulated audio signal undergoes demodulation processing and decode processing by the transmitter/receiver circuit 14. The received voice signal thus acquired is output from the speaker 18. A voice signal to be transmitted taken by the microphone 16 undergoes encoding processing and modulation processing by the transmitter/receiver circuit 14. The modulated audio signal thus generated is sent to the intended party by using the antenna 12 as described above.

Furthermore, when a data communication operation is performed with a network 100 by the key input device 22, the CPU 20 starts to communicate with the network 100 through the antenna 12 and the transmitter/receiver circuit 14. The network 100 is connected with a plurality of network servers not shown, and the CPU 20 performs a data communication with each of the plurality of network server via the network 100. An LCD driver 24 controls the main LCD monitor 26 and the sub LCD monitor 28 to display images and sentences that are obtained by the data communications. In addition, the mobile communication terminal 10 can execute a navigation function (route guidance for a walker) by making data communications.

When the user starts the navigation function processing to set a destination, the CPU 20 activates a GPS (Global Positioning System) control circuit 40. A plurality of GPS signals respectively output from a plurality of GPS satellites are received by a GPS antenna 42. The CPU 20 acquires a present location of the mobile communication terminal 10 (user) from the received GPS signal. Then, the CPU 20 obtains map data including route guiding information from the present location to the destination by sending the acquired present location and the set destination to a navigation server not shown via the network 100. The acquired map data is stored in the RAM 36, and displayed on the main LCD monitor 26 by the CPU 20. Thus, the user can easily move to the set destination on the basis of the map data including the route guiding information displayed on the main LCD monitor 26.

FIG. 2 (A) shows an external view in the open position, and FIG. 2 (B) shows an external view in the closed position. Referring to FIG. 2 (A) and FIG. 2 (B), the mobile communication terminal 10 has a case C1 and a case C2 each of which is formed in a plate shape. The thickness of each of the case C1 and the case C2 is approximately the same. The antenna 12 is an extendable antenna which is extendably configured, and provided to be protruded from an upper surface of the case C1. Here, it is conceivable that the antenna 12 may be an integrated antenna, and may be contained in the cases C1 or C2.

In FIG. 2, the microphone 16 not shown is integrated in the case C2, and an opening op2 communicated to the integrated microphone 16 is provided to an inner surface of the case C2 at one end of a longitudinal direction. Similarly, in FIG. 2, the speaker 18 not shown is integrated in the case C1, and an opening op1 communicated to the integrated speaker 18 is provided to an inner surface of the case C1 at the other end of the longitudinal direction. That is, the user listens to sound output from the speaker 18 through the opening op1 and inputs sound into the microphone 16 through the opening op2.

The key input device 22 is attached to the case C2 such that operation keys are exposed from the inner surface of the case C2. The main LCD monitor 26 is attached to the case C1 such that a monitor screen is exposed from the inner surface of the case C1. The sub LCD monitor 28 is attached to the case C1 such that a monitor screen is exposed from the outer surface of the case C1. A magnetic sensor 30 is integrated in the case C1. A magnet 32 is integrated in the case C2 so as to be closest to the magnetic sensor 30 in a state in FIG. 2 (B).

An LED 38 is provided on the inner surface of the case C1 so as to be in contact with the main LCD monitor 26. A hinge mechanism H is formed at the other end of the case C2 of the longitudinal direction as a hinge mechanism. The case C1 is coupled with the hinge mechanism H at the other end of the longitudinal direction. Furthermore, the hinge mechanism H1 is movable with reference to an axis AX in parallel with a short side of the inner surface of the case C2 in a state that the case C1 is laminated to the case C2. That is, by the rotation with reference to the axis AX, the case C1 and the case C2 are opened and closed.

The magnetic sensor 30 outputs 0 being a minimum value in a state shown in FIG. 2 (A), and outputs 255 being a maximum value in FIG. 2 (B). That is, in the open position shown in FIG. 2 (A), the magnetic sensor 30 outputs a minimum value, and in the closed position shown in FIG. 2 (B), the magnetic sensor 30 outputs a maximum value.

The LED 38 used in the first embodiment has five colors. FIG. 3 is an illustrative view showing a corresponding relationship between the colors of the LED and the patterns illustrated in the drawings. Referring to FIG. 3, the illustration in the drawing by the pattern a corresponds to a colorless state. That is, the LED 38 indicated by the pattern a is colorless, and shows a state that a light is not emitted. The illustration in the drawing indicated by the pattern b corresponds to green. That is, the LED 38 indicated by the pattern b shows a state that it emits a light in green. The illustration indicated in the drawing by the pattern c corresponds to red. That is, the LED 38 indicated by the pattern c shows a state that it emits a light in red. The illustration indicated in the drawing by the pattern d corresponds to yellow. That is, the LED 38 indicated by the pattern d shows a state that it emits a light in yellow. The illustration indicated in the drawing by the pattern e corresponds to orange. That is, the LED 38 indicated by the pattern e shows a state that it emits a light in orange. Here, the LED 38 can emit light in full color, so it emits lights in various colors other than green, red, yellow and orange.

Explained is a light guidance sub-function of notifying whether or not a traveling direction of the user is correct by the color of the light emitted by the LED 38 when the user uses a route guidance of the navigation function, notifying what direction the user has to go (route direction) when the traveling direction of the user is directed to an wrong direction by changing the color emitted by the LED 38, and prompting the user to change his or her traveling direction to the direction of the route.

FIG. 4 is an illustrative view showing a map display including route guiding information from a present location to a certain destination on the main LCD monitor 26, and showing surroundings of the main LCD monitor 26 including the LED 38, etc. Referring to FIG. 4, in the map shown by the main LCD monitor 26, an object Ob representing a position of the mobile communication terminal 10 with respect to the map is further displayed. Furthermore, the LED 38 emits light in green, and this is illustrated by the pattern b in the drawing. In addition, the mobile communication terminal 10 is held by the user such that the direction shown by an arrow Y1 becomes the traveling direction of the user in a state that the inner surface of the case C1 is horizontal to the ground. Here, by a gyro sensor 48 (see FIG. 1), a change in manner in which the mobile communication terminal 10 is held is detected, and the manner in which the mobile communication terminal 10 is held and the traveling direction may be brought into correspondence with each other.

The traveling direction is evaluated by using a geomagnetism sensor 46 (see FIG. 1) or the gyro sensor 48 (see FIG. 1). For example, the CPU 20 detects geomagnetism by the geomagnetism sensor 46 if the mobile communication terminal 10 does not move, and can calculate a traveling direction in which the mobile communication terminal 10 will move from now by a direction detecting circuit 44 (see FIG. 1). For example, if the traveling direction of the mobile communication terminal 10 turns to the north, the traveling direction in which the mobile communication terminal 10 will move from now becomes the north. Furthermore, the CPU 20 can calculate the traveling direction in which the mobile communication terminal 10 proceeds by the gyro sensor 48 while the position of the mobile communication terminal 10 changes. Here, the logs of the received GPS signals are recorded, and from the logs, a traveling direction may be calculated.

Furthermore, in a case that the LED 38 emits light in green (pattern b), the traveling direction is coincident with the direction of the route shown by the arrow Y2, and indicates that the user proceeds in the direction of the route. That is, the user can confirm that his or her own traveling direction is correct. Here, in a case that the user proceeds in the direction of the route, the LED 38 may not be emitted so as to reduce power consumption of a battery not shown provided to the mobile communication terminal 10.

FIG. 5 is an illustrative view showing a map display including route guiding information from a present location to a certain destination on the main LCD monitor 26, and shows that the LED 38 emits light in yellow. Referring to FIG. 5, in a case that the LED 38 emits light in yellow (pattern d), this shows that the user does not proceed in the direction of the route shown by the arrow Y3, and the traveling direction shown by the arrow Y1 turns to the right with respect to the direction of the route in a state that the present location of the mobile communication terminal 10 is within the route. In this case, when the user changes his or her traveling direction to the left so as to make the traveling direction shown by the arrow Y1 is coincident with the direction of the route shown by the arrow Y3, the user can proceeds to the direction of the route shown by the arrow Y3. Furthermore, when the user turns his or her traveling direction to the left, the LED 38 can change its light-emission from yellow to green. Then, the user can proceeds along the direction of the route by changing his or her traveling direction to the left. That is, in a case that the LED 38 emits light in yellow, this means that the route is in the left with respect to the current traveling direction.

Here, in FIG. 4 and FIG. 5, a map including the route guiding information is displayed on the main LCD monitor 26, but by a multi tasking function for simultaneously performing a plurality of functions, an image showing a music player function and a FM radio function, etc. may be displayed without display the map.

FIG. 6(A) and FIG. 6 (B) are illustrative views showing a state the LED 38 emits light in colors other than green and yellow in a case that a route guidance is performed by the navigation function. First, referring to FIG. 6(A), in a case that the LED 38 emits light in orange (pattern e), the LED 38 notifies that the traveling direction is not coincident with the direction of the route, and the traveling direction is turned to the left with respect to the direction of the route. Then, when the user turns his or her traveling direction to the right, the mobile communication terminal 10 changes the color of the light that the LED 38 emits from orange to green. Then, the user can proceeds in the direction of the route by turning the traveling direction to the right.

Next, referring to FIG. 6(B), in a case that the LED 38 emits light in red (pattern c), the LED 38 shows that the traveling direction is not coincident with the direction of the route, and is turned to a direction reverse to the direction of the route (backward direction). Then, when the user turns his or her traveling direction to the reverse direction, the color of the light which the LED 38 emits can be changed from red to green. Then, the user can proceeds in the direction of the route by turning the traveling direction to the direction reverse to the traveling direction. That is, the light in orange emitted by the LED 38 notifies that the route is in the left direction whereas the light in red notifies that the route is in the reverse direction (backward direction).

Thus, even if the user is on the route designated by the navigation function, if the traveling direction is not coincident with the direction of the route, he or she easily perceive a correct traveling direction (route direction) from the color of the light emitted by the LED 38, and can proceed to the perceived route direction.

In addition, in a case that the user using the mobile communication terminal 10 does not go along the route designated by the navigation function (off the route) as well, the user can easily confirm whether or not his or her own traveling direction is correct on the basis of the light emitted by the LED 38. More specifically, when the user goes off the route, the direction of his or her traveling direction changes according to the direction in which the route exists, and therefore, the mobile communication terminal 10 evaluates the direction in which the route exists from the point where the user goes off the route, his or her own present location calculated from a GPS signal received by the GPS antenna 42 and his or her own traveling direction. Then, the mobile communication terminal 10 informs the user the direction in which the route exists by lighting up the LED 38. Thus, the user can return to the route by going toward the notified direction.

For example, in a case that the direction of the route turns to the north, if the user proceeds to the east (right) off the route, the mobile communication terminal 10 goes off the route to the right direction, and proceeds to a direction far away from the traveling direction. In this case, the LED 38 lights up in red (pattern c). That is, the mobile communication terminal 10 notifies the user that the route exists in a direction reverse to the traveling direction. That is, the user can confirm that he or she goes off the route, so by turning the traveling direction to the reverse direction (backward direction), the user can return to the route. Furthermore, when the user turns the traveling direction to the reverse direction, the light emitted by the LED 38 changes from red to green to thereby notify that the traveling direction is turned to the route. That is, the user can confirm that the traveling direction is turned to the direction in which the route exists. Then, if the present location of the mobile communication terminal 10 returns to the route, the LED 38 emits light in color indicating the direction of the route, so that the user can proceed toward the direction of the route as illustrated in FIG. 4 and FIG. 5.

Thus, the user can easily perceive whether or not his or her own traveling direction is correct by the color of the light emitted by the LED 38 in a case that his or her traveling direction is wrong in a direction off the route, in a case that the user returns to the direction in which the route exists and in a case that the direction of the route is unknown when he or she returns to the route.

In addition, in a case that the traveling direction and the direction of the route are coincident with each other even if the user goes off the route, the mobile communication terminal 10 notifies the user of the direction in which the route exists by the light-emission of the LED 38. In this case, the user is positioned in any one of the right and left directions with respect to the route as a result. Then, if the user is at the right of the route, the direction in which the route exists is a left direction, so that the mobile communication terminal 10 causes the LED 38 to light up in yellow (pattern d). Thus, the user can confirm that the route is at the right with respect to his or her own traveling direction, so that if the user turns his or her own traveling direction to the left, he or she can proceed to the direction in which the route exists.

Furthermore, if the user is at the left with respect to the route, the direction in which the route exists is the right direction, and therefore, the mobile communication terminal 10 causes the LED 38 to light up in orange (pattern e). Thus, the user can confirm that the route is at the right with respect to his or her traveling direction. Then, if the user turns his or her own traveling direction to the right, he or she can proceed toward the direction in which the route exists.

For example, if the user goes toward a destination in a route different from the route indicated by the route guiding information (takes a shortcut), the traveling direction and the direction of the route are sometimes coincident. At this time, if the user is at the left with respect to the route, the mobile communication terminal 10 causes the LED 38 to light up in orange (pattern e). Thus, the user can confirm the direction in which the route exists even if he or she intentionally goes off the route by taking a shortcut, and the user can quickly return to the route by going toward the notified direction.

Here, if a predetermined time elapses since the mobile communication terminal 10 is off the route, the re-route information (route guiding information from the present position of the mobile communication terminal 10 which is off the route to the destination) is sent from the navigation server, and the mobile communication terminal 10 is in a state that it is positioned in a new route therein. Furthermore, the light guidance sub-function is arbitrarily settable by the user, and can be set by a GUI (Graphical User Interface), etc. not shown. Furthermore, the mobile communication terminal 10 may notify the user whether or not the traveling direction is correct not only by the change of the colors of the LED 38 but also by flashing cycles of the LED 38.

FIG. 7 is an illustrative view showing a memory map of the RAM 36. Referring to FIG. 7, in the memory map of the RAM 36, a program memory area 60 and a data memory area 62 are included. Parts of the programs and data are read from the flash memory 34 entirely at a time, or partially and sequentially so as to be stored into the RAM 36, and is executed by the CPU 20, etc. Here, in FIG. 7, only a part of the memory map is shown, and other programs and data which are necessary for the processing are also stored.

The program memory area 60 stores a program for operating the mobile communication terminal 10. The program for operating the mobile communication terminal 10 is made up of a navigation function execution processing program 60a, etc. The navigation function execution processing program 60a is a program for executing processing when a route guidance is performed by the navigation function. For example, when the route guidance is started, if the light guidance sub-function is set, the color of the light which the LED 38 emits is decided, and if the light guidance sub-function is not set, route guidance is performed by sound and display of images.

Although illustration is omitted, the program for operating the mobile communication terminal 10 includes a program for making communications, controlling data communications with the network server and displaying the current date and time, etc.

In the data memory area 62, a communication data buffer 62a and a GPS data buffer 62b are provided. Furthermore, in the data memory area 62, image data 62c, character string data 62d, gyro data 62e, geomagnetism sensor data 62f and route guiding data 62g are provided.

The communication data buffer 62a is a buffer for temporarily storing data obtained through data communications with each of the plurality of network servers via the network 100. Furthermore, data of the route guiding information sent from the navigation server is also temporarily stored. The GPS data buffer 62b is for temporarily storing data of a GPS signal received by the GPS antenna 42.

The image data 62c is data of images to be displayed on the main LCD monitor 26 and the sub LCD monitor 28 of the mobile communication terminal 10. Furthermore, the images to be displayed on the main LCD monitor 26 and the sub LCD monitor 28 are images of GUI, and images to be displayed during standby of the mobile communication terminal 10. The character string data 62d is character string data to be displayed on the main LCD monitor 26 and the sub LCD monitor 28 of the mobile communication terminal 10. The character strings to be displayed on the main LCD monitor 26 and the sub LCD monitor 28 are hiragana characters, katakana characters, kanji characters, numeral characters and alphabetical characters.

The gyro data 62e is data obtained from the gyro sensor 48. The geomagnetism sensor data 62f is data obtained by processing the data of the geomagnetism sensor 46 by the direction detecting circuit 44. Furthermore, the CPU 20 evaluates a traveling direction on the basis of the gyro data 62e and the geomagnetism sensor data 62f.

In the route guiding data 62g, the data of the route guiding information temporarily stored in the communication data buffer 62a is stored. Furthermore, the CPU 20 displays a map including the route guiding information from the present location to a certain destination on the main LCD monitor 26 on the basis of the route guiding data 62g.

Although illustration is omitted, in the data memory area 62, data for displaying current time and other data are stored, and other counters and flags necessary for an operation of the mobile communication terminal 10 are also provided.

More specifically, the CPU 20 executes in parallel a plurality of tasks including navigation function executing processing shown in FIG. 8 under the control of the multitasking OS, such as μITRON, Symbian, etc.

FIG. 8 is a flowchart showing the navigation function executing processing. Referring to FIG. 8, in a step S1, a map obtained from the navigation server is displayed on the main LCD monitor 26 to start route guidance. That is, the CPU 20 displays the map including the route guiding information on the main LCD monitor 26 on the basis of the route guiding data 62g and starts the route guidance. In a next step S3, a present location with respect to the route is calculated. That is, the CPU 20 evaluates a present location of the mobile communication terminal 10 with respect the route shown by the route guidance from the data of the GPS signal temporarily stored in the GPS data buffer 62b. In a following step S5, a traveling direction is calculated. That is, the CPU 20 calculates a traveling direction of the mobile communication terminal 10 on the basis of the gyro data 62e and the geomagnetism sensor data 62f.

In a next step S7, it is determined whether or not a light guidance is set. That is, it is determined whether or not a light guidance sub-function is set. If "YES" in the step S7, that is, if the light guidance sub-function is set, it is determined whether or not it is on the route in a step S9. That is, it is determined whether or not the present location of the mobile communication terminal 10 evaluated in the step S3 is not off the route. If "YES" in the step S9, that is, if the present location of the mobile communication terminal 10 is not off the route, it is determined whether or not the direction of the route and the traveling direction are coincident with each other in a step S11. That is, it is determined whether or not the traveling direction of the mobile communication terminal 10 evaluated in the step S5 is coincident with the direction of the route indicated by the route guiding information.

If "YES" in the step S11, that is, if the direction of the route indicated by the route guiding information and the traveling direction of the mobile communication terminal 10 are coincident with each other, the LED 38 is caused to light up in green (pattern b) as shown in FIG. 4 in a step S13, and the process proceeds to a step S19. That is, the traveling direction of the mobile communication terminal 10 is coincident with the direction of the route, and thus, the mobile communication terminal 10 notifies the user that he or she proceeds in a correct direction. On the other hand, if "NO" in the step S11, that is, if the direction of the route indicated by the route guiding information and the traveling direction of the mobile communication terminal 10 are not coincident with each other, the LED 38 is lit up by the color indicating the direction of the route in a step S15, and the process proceeds to the step S19. For example, if the traveling direction of the mobile communication terminal 10 is wrong toward the right with respect to the direction of the route, the mobile communication terminal 10 causes the LED 38 to light up in yellow (pattern d) to thereby notify that the traveling direction has to be turned to the left direction.

If "NO" here in the step S9, that is, if the present location of the mobile communication terminal 10 is off the route, the LED 38 is lit up by the color indicating the direction where the route exists from the present location and the traveling direction in a step S17, and the process proceeds to the step S19. That is, the LED 38 is lit up by the color indicating the direction where the route exists from the present location and the traveling direction of the mobile communication terminal 10 which are respectively obtained in the steps S3 and S5. For example, if the route exists in the reverse direction of the traveling direction, the CPU 20 causes the LED 38 to light up in red (pattern c), if the route exists at the left with respect to the traveling direction, the CPU 20 causes the LED 38 to light up in yellow (pattern d), and if the route exists at the right with respect to the traveling direction, the CPU 20 causes the LED 38 to light up in orange (pattern e).

In the step S19, it is determined whether or not the route guidance is to be interrupted. For example, if there is an operation by the interrupt key not shown included in the key input device 22, an interruption of the communication with the network 100, a receiving error of the GPS signal, etc., the route guidance is interrupted. If "NO" in the step S19, that is, if the route guidance is not in an interruption state, it is determined whether or not the user arrives at the destination in a step S21. That is, it is determined whether or not the present location evaluated from the received GPS signal is coincident with the position of a certain destination. If "YES" in the step S21, that is, if the present location is coincident with the position of a certain destination, the navigation function executing processing is ended. On the other hand, if "NO" in the step S21, that is, if the present location is not coincident with the position of a certain destination, the process returns to the step S1. Furthermore, if "YES" in the step S19, that is, if the route guidance is in an interruption state, the navigation function executing processing is ended similar to the case that "YES" is determined in the step S21. In addition, if "NO" in the step S7, that is, if the light guidance sub-function is not set, the process proceeds to the step S19 without performing the steps S9-S17.

As can be understood from the above-described explanation, the mobile communication terminal 10 has a navigation function for performing a route guidance from the present location to the destination by utilizing the network 100 and the GPS signal. The geomagnetism sensor 46, the direction detecting circuit 44 and the gyro sensor 48 detects a traveling direction of the mobile communication terminal 10 (user). The CPU 20 determines whether or not the traveling direction and the direction of the route instructed by the navigation function are coincident with each other by the processing in the step S11. Then, if the traveling direction and the direction of the route are coincident with each other, the LED 38 is caused to light up in green to notify that the traveling direction is correct. On the other hand, if the traveling direction and the direction of the route are not coincident with each other, the LED 38 notifies the direction the user to go by emitting light in any one of the red, yellow and orange.

Thus, the user can easily confirm whether or not his or her own traveling direction is correct on the basis of the color of the light emitted by the LED 38.

Second Embodiment

In a second embodiment shown in FIG. 9, the LED 38 is provided to the surface on which the main LCD monitor 26 is not provided. Furthermore, the second embodiment is the same as the first embodiment in the corresponding relationship between the colors of the light emitted by the LEDs and the patterns described in the drawing shown in FIG. 3, the memory map of the RAM 36 shown in FIG. 7 and the navigation function executing processing shown in FIG. 8, and therefore, a redundant explanation is omitted in the second embodiment. In addition, in the second embodiment, the sub LCD monitor 28 shown in FIG. 1 is not included in the mobile communication terminal 10.

Referring to FIG. 9(A) and FIG. (B), with respect to the case C1, the case C2, the antenna 12, the key input device 22, the main LCD monitor 26, the magnetic sensor 30, the magnet 32, the opening op1, the opening op2, the hinge mechanism H and the axis AX, the details are the same as those explained by using FIG. 2 (A) and FIG. 2(B), and therefore, a redundant explanation is omitted. Then, the LED 38 is provided to the surface (outer surface) of the case C1 to which the main LCD monitor 26 is not attached. Here, the LED 38 may be used so as to notify the user of an incoming call.

Additionally, similar to the first embodiment, when the traveling direction of the mobile communication terminal 10 is coincident with the direction of the route, the LED 38 emits light in green (pattern b). That is, the user can perceive that his or her own traveling direction is correct by the LED 38. Then, if the traveling direction of the mobile communication terminal 10 is different from the direction of the route or if the present location of the mobile communication terminal 10 is off the route, the LED 38 lights up in yellow (pattern d), orange (pattern e) or red (pattern c) similar to the first embodiment. That is, the user can confirm that his or her own traveling direction is wrong, and what direction he or she has to go (route direction).

Thus, the user can determine whether or not he or she goes in the direction of the route only with the light-emission of the LED 38 without seeing the map including the route guiding information.

Here, in the second embodiment as well, the sub LCD monitor 28 similar to FIG. 2 (B) may be provided, and in the closed position shown in FIG. 9(B), a message saying that the navigation function is executed, a message saying that the map including the route guiding information is displayed on the main LCD monitor 26, etc. may be displayed.

Third Embodiment

In a third embodiment shown in FIG. 10(A) and FIG. 10(B), four LEDs 38 are provided to the case C1, and even if the mobile communication terminal 10 is in the closed position, the user can know the light-emission of the LED 38. Furthermore, the third embodiment is the same as the first embodiment in the corresponding relationship between the colors of the light emitted by the LEDs and the patterns described in the drawing shown in FIG. 3 and the memory map of the RAM 36 shown in FIG. 7, and therefore, a redundant explanation is omitted in the third embodiment. Furthermore, in the third embodiment, similar to the second embodiment, the sub LCD monitor 28 shown in FIG. 1 is not included in the configuration of the mobile communication terminal 10. The LED 38 is connected to the CPU 20 as four LEDs such as an LED 38*a*, an LED 38*b*, an LED 38*c* and an LED 38*d*. Here, the LED 38*a*-38*d* are called the LED 38 when they need not be identified.

Referring to FIG. 10(A) and FIG. 10(B), with respect to the case C1, the case C2, the antenna 12, the key input device 22, the main LCD monitor 26, the magnetic sensor 30, the magnet 32, the opening op1, the opening op2, the hinge mechanism H and the axis AX, details are the same as those explained by utilizing FIG. 2 (A) and FIG. 2(B), and therefore, a redundant explanation is omitted. The LED 38*a* is provided to a side surface of the case C1 at one end of a longitudinal direction. The LED 38*b* is provided to a side surface of the case C1 at one end of another longitudinal direction. The LED 38*c* is provided to the hinge mechanism H. The LED 38*d* is provided to the side surface of the case C1 at the other end of the other longitudinal direction.

Figure 11:
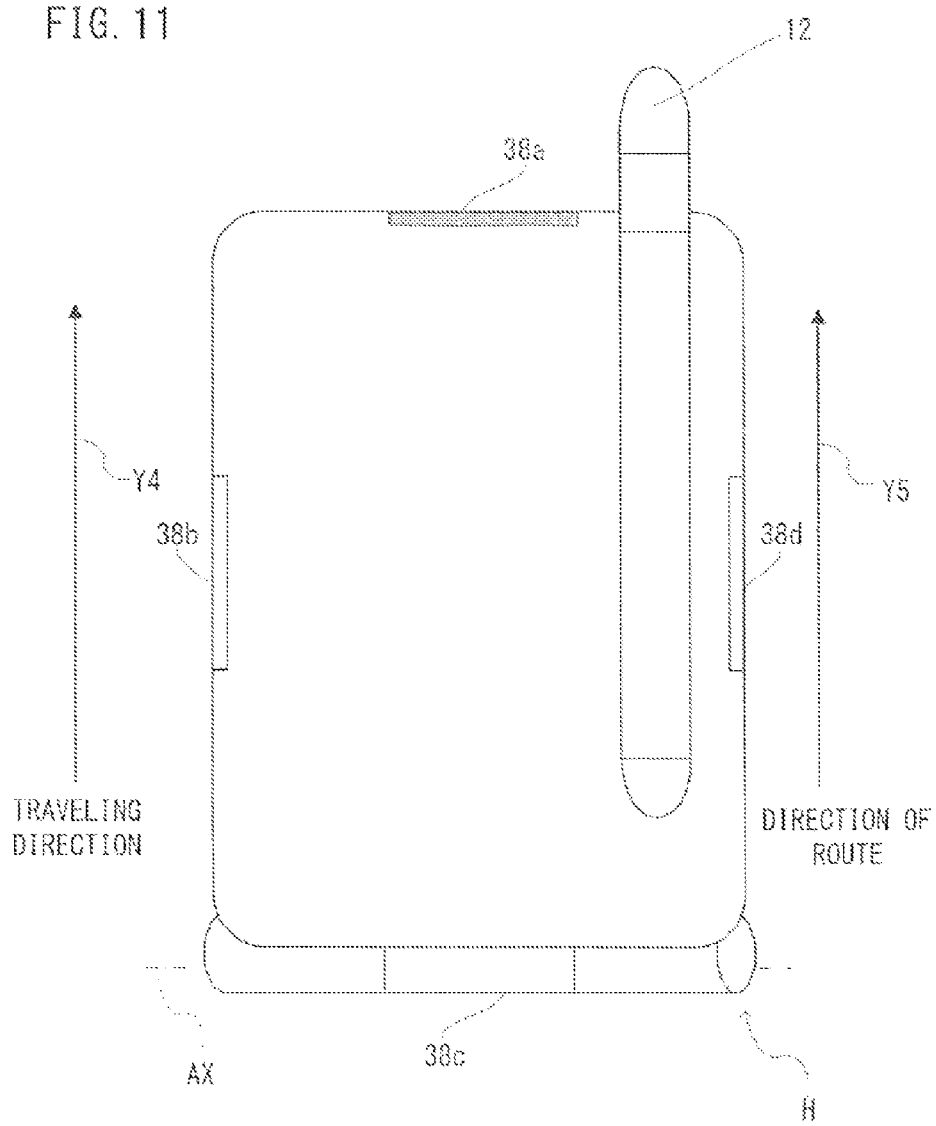
FIG. 11 is an illustrative view showing one example of colors indicted by four LEDs shown in a third embodiment of the present invention.

FIG. 11 is an illustrative view in the closed position shown in FIG. 10(B) showing colors of the LEDs 38 in a case that the light guidance sub-function is set. Referring to FIG. 11, the LED 38*a* lights up in green, and is illustrated by the pattern b in the drawing. Furthermore, the LEDs 38*b*-38*d* do not light up, so that they are illustrated by the pattern a in the drawing. In addition, the mobile communication terminal 10 is held by the user such that the direction shown by the arrow Y4 becomes the traveling direction of the user in a state that the outer surface of the case C1 is horizontal to the ground. Thus, in a case that the LED 38*a* lights up in green (pattern b), this shows that the traveling direction is coincident with the direction of the route shown by the arrow Y5, and the user proceeds in the correct route. That is, the user can perceive that his or her own traveling direction is correct. Here, similar to the first embodiment, by the gyro sensor 48, a change in manner in which the mobile communication terminal 10 is held is detected, and the manner in which the mobile communication terminal 10 is held and the traveling direction may be brought into correspondence with each other.

Figure 12:
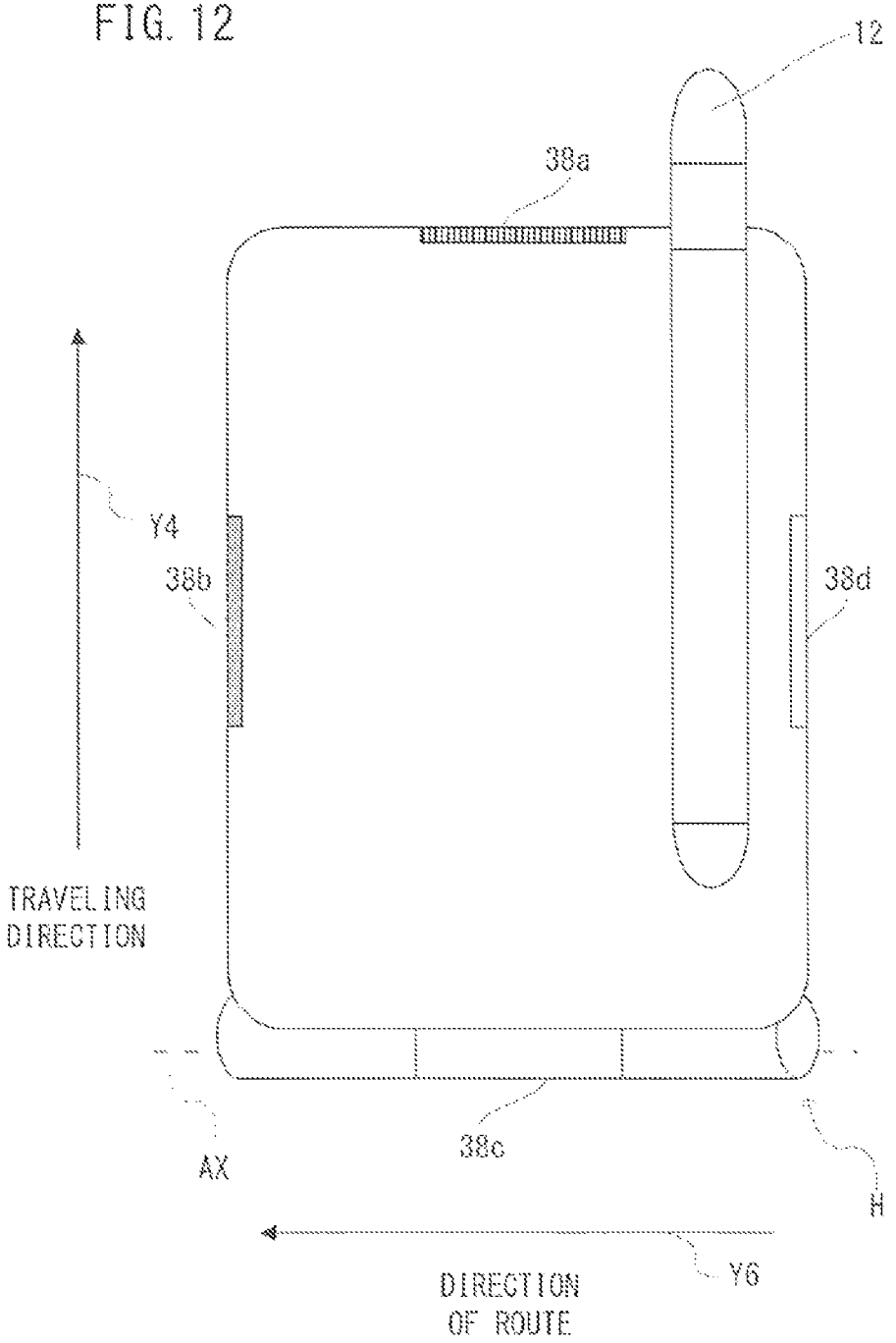
FIG. 12 is an illustrative view showing another example of the colors indicated by the four LEDs shown in the third embodiment of the present invention.

FIG. 12 is another illustrative view in the closed position shown in FIG. 10(B) showing colors of the LEDs 38 in a case that the light guidance sub-function is set. Referring to FIG. 12, in a case that the LED 38*a* lights up in red (pattern c), the LEDs 38*b*, 38*c* do not light up, and the LED 38*d* lights up in green (pattern b), this notifies that the user does not go to the direction of the route shown by the arrow Y6, and the traveling direction shown by the arrow Y4 is turned to the right with respect to the direction of the route in a state that the present location of the mobile communication terminal 10 is within the route. In this case, if the user turns the traveling direction to the left such that the traveling direction shown by the arrow Y4 is coincident with the direction of the route shown by the arrow Y6, the user can go to the traveling direction shown by the arrow Y6. Furthermore, when the user turns the traveling direction to left, the mobile communication terminal 10 changes the light emitted by the LED 38*a* from red to green, and makes the LED 38*b* light off. Then, the user turns the traveling direction to the left to thereby perceive the correct traveling direction. That is, in a case that the LED 38*b* lights up in red, this notifies that the route is in the left with respect to the present traveling direction.

In addition, in the state of each of the LEDs 38 shown in FIG. 12, that the traveling direction is off the route to the right direction with the traveling direction and the route direction coincident may be notified. In this case, when the user turns to the left at the corner which allows turning to the left direction, the mobile communication terminal 10 changes the color of the light emitted by the LED 38*a* from red to green, and makes the LED 38*b* light off. That is, it is confirmed that his or her own traveling direction turns to the direction which returns to the route.

That is, similar to the first embodiment, the user can easily perceive whether or not his or her own traveling direction is correct and which direction to go depending on the position where each of the LEDs 38 lights up in a case that his or her traveling direction is wrong in a direction off the route, in a case that the user returns to the direction in which the route exists, and in a case that the direction of the route is unknown when he or she returns to the route.

Here, in a case that the user goes along a correct route, the LED 38*a* is lit off, and only when the user does not go along the correct route, the LED 38*a* may light up in red (pattern c). Thus, the LED 38*a* may use a single colored light-emission LED of red, and each of the LEDs 38*b*-38*d* uses a single colored light-emission LED of green.

The navigation function executing processing of the third embodiment is the same as that of the first embodiment as to the processing in the steps S1-S7 and steps S19-S21, and therefore, the detailed explanation is omitted. Furthermore, the determinations as to the processing in the step S19 and in the step S11 are the same as those in the first embodiment, and the detailed explanation is omitted.

Figure 13:
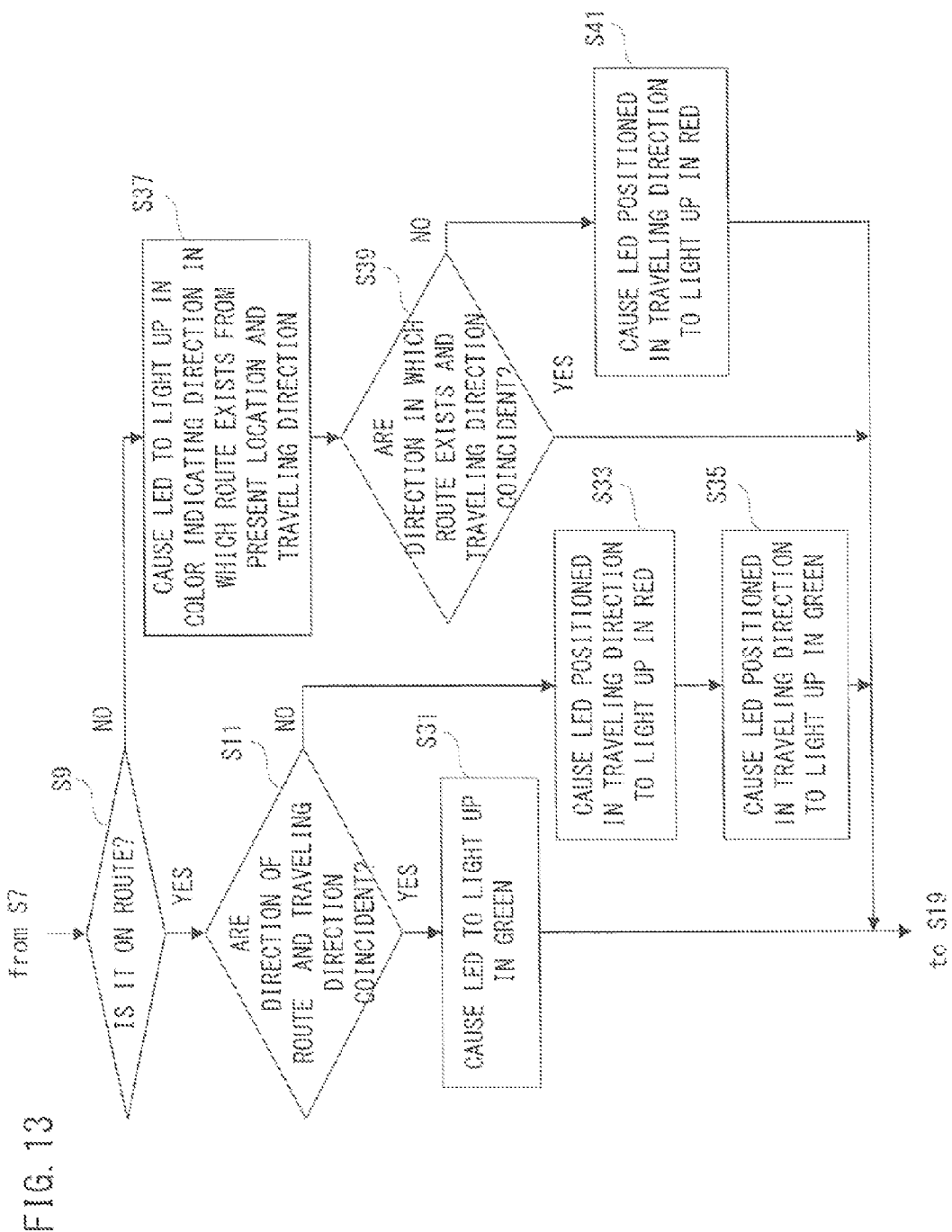
FIG. 13 is a flowchart showing a part of navigation function executing processing to be executed by the CPU of the mobile communication terminal shown in FIG. 1.

FIG. 13 is a flowchart showing processing of controlling the light-emission of the LEDs 38*a*-38*d* after the step S9 in a case that "YES" is determined in the step S7 shown in FIG. 8. Referring to FIG. 13, if "YES" in the step S9, it is determined whether or not the direction of the route and the traveling direction are coincident with each other in the step S11. If "YES" in the step S11, the LED 38 positioned in the traveling direction is caused to light up in green in a step S31, and the process proceeds to the step S19 shown in FIG. 8. That is, the CPU 20 causes the LED 38*a* light up in green (pattern b), and notifies the user that the traveling direction is correct. On the other hand, if "NO" in the step S11, the LED 38 positioned in the traveling direction is caused to light up in red in a step S33. That is, the CPU 20 causes the LED 38*a* to light up in red. In a next step S35, the LED 38 positioned in the direction of the route is caused to light up in green, and the process proceeds to the step S19 shown in FIG. 8. For example, if the traveling direction is turned to the right with respect to the direction of the route, the CPU 20 causes the LED 38*b* light up in green (pattern c), if the traveling direction is turned to the left with respect to the direction of the route, the LED 38*d* is caused to light up in green, and if the traveling direction is turned to the reverse direction of the direction of the route, the CPU 20 causes the LED 38*c* light up in green.

Here, if "NO" in the step S9, that is, if the present location of the mobile communication terminal 10 is off the route, the LED 38 positioned at the side where the route exists is light up in green (pattern b) from the present location and the traveling direction in a step S37. That is, the CPU 20 causes the LED 38 to light up in green (pattern b) at the side where the route exists from the present location and the traveling direction of the mobile communication terminal 10 which are respectively obtained from the processing in the steps S3 and S5. For example, if the route exists in the reverse direction of the traveling direction, the CPU 20 causes the LED 38*c* to light up in green, if the route exists at the left with respect to the traveling direction, the CPU 20 causes the LED 38*b* to light up in green, if the route exists at the right with respect to the traveling direction, the CPU 20 causes the LED 38*d* to light up in green, and if the user returns to the route, the CPU 20 causes the LED 38*a* to light up in green.

In a next step S39, it is determined whether or not the direction in which the route exists and the traveling direction are coincident with each other. That is, it is determined whether or not the user returns to the route. If "YES" in the step S39, that is, if the user is returned to the route, the process proceeds to the step S19 in FIG. 8. On the other hand, if "NO" in the step S39, that is, if the user is not returned to the route, the LED 38 positioned in the traveling direction is lit up in red (pattern c) in a step S41, and the process proceeds to the step S19. That is, the CPU 20 causes the LED 38*a* light up in red (pattern c).

Here, in the third embodiment, even in the open position shown in FIG. 10(A), the user can perceive the color of the light emitted by the LED 38. Furthermore, the CPU 20 detects the change in position between the open position shown in FIG. 10(A) and the closed position shown in FIG. 10(B) by the magnetic sensor 30 and the magnet 32, and can change of the light-emission of each of the LEDs 38. Furthermore, as shown in Japanese Patent Application Laid-Open No. 2001-156893 or Japanese Patent Application Laid-Open No. 2003-338866, even if the LED 38 and the case C1 are movable with respect to the main surface of the case C1, by detecting the change of the LED 38 as to the traveling direction and the direction of the route by the magnetic sensor 30 and the magnet 32, etc., the state of the LED 38 and the traveling direction may be brought into correspondence with each other. Additionally, the number of LEDs 38 is not restricted to four, and may be five or more.

In addition, in FIG. 10 to FIG. 12 shown in the third embodiment, the antenna 12 may be integrated in the case C1 or C2 by utilizing the integrated antenna.

Fourth Embodiment

In a fourth embodiment shown in FIG. 14, four LEDs 38 are provided at a surrounding area of the main LCD monitor 26. Furthermore, the fourth embodiment is the same as the first embodiment in the corresponding relationship between the colors of the light emitted by the LEDs and the patterns described in the drawing shown in FIG. 3, the memory map of the RAM 36 shown in FIG. 7, the navigation function executing processing shown in FIG. 8, and processing of controlling the light-emission of the LEDs 38a-38d shown in FIG. 13 used in the explanation of the third embodiment, and therefore, a redundant explanation is omitted in the fourth embodiment. Additionally, in the fourth embodiment, similar to the third embodiment, the LED 38 is connected to the CPU 20 as four LEDs, such as an LED 38a, an LED 38b, an LED 38c and an LED 38d.

Referring to FIG. 14, as to the case C1, the case C2, the antenna 12, the key input device 22, the main LCD monitor 26, the magnetic sensor 30, the magnet 32, the opening op1, the opening op2, the hinge mechanism H and the axis AX, the details are the same as those explained in FIG. 2(A) and FIG. 2(B), and therefore, a redundant explanation is omitted. Then, the LEDs 38a-38d are provided at a surrounding area of the main LCD monitor 26.

Moreover, a light guidance sub-function is set to the LED 38, and in a case that the navigation function is executed, if the traveling direction of the mobile communication terminal 10 is coincident with the direction of the route, the mobile communication terminal 10 causes the respective LEDs 38a-38d to light up similar to the respective LEDs 38 shown in FIG. 11. That is, the user confirms that his or her own traveling direction is correct similar to the third embodiment. Furthermore, in a case that the traveling direction of the mobile communication terminal 10 is different from the direction of the route or if the present location of the mobile communication terminal 10 is off the route, the respective LEDs 38a-38d are lit up in green (pattern b) or red (pattern c). That is, the user can confirm what direction the user has to go (route direction).

It should be noted in the first embodiment to the fourth embodiment, it is needless to say that as the communication system of the mobile communication terminal 10, a PHS system, etc. may be adopted over the CDMA system, the W-CDMA system, and the TDMA system. Moreover, the LED 38 may include organic electroluminescence, light emitting polymer, etc. Furthermore, a mobile communication terminal 10 capable of performing route guidance without using the network server may have a light guidance sub-function. Then, a handheld terminal, such as PDA (Personal Digital Assistant), etc. capable of performing route guidance and a portable game terminal operated according to route guiding software may be appropriate over only the mobile communication terminal 10.

In addition, in the above-described first embodiment to the fourth embodiment, the present location of the mobile communication terminal 10 is evaluated from the GPS signal, but the present location may be evaluated from communications between a wireless LAN communication port having a narrow communication area such as a hot spot (registered trademark), etc and the mobile communication terminal 10. That is, the present location of the mobile communication terminal 10 may be evaluated from the communications between other communication appliance and the mobile communication terminal 10 other than the received GPS signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile communication terminal having a navigation function to perform route guidance from a present location to a destination by obtaining information of the present location, comprising:
 a traveling direction detector which detects a traveling direction of said mobile communication terminal;
 a determiner which determines whether or not the traveling direction detected by said traveling direction detector is coincident with a direction of a route designated by said navigation function; and
 a notifier which notifies by a visual effect at least one of whether or not the traveling direction detected by said traveling direction detector is correct on the basis of a determination result by said determiner, wherein said notifier includes an error notifier which notifies that the traveling direction is wrong by a color when said determiner determines not to be coincident;
 wherein said notifier further includes a direction notifier which notifies a direction to go by a color when said determiner determines not to be coincident, and
 wherein said notifier further includes one light-emitting element capable of lighting up in a plurality of colors, and said error notifier notifies that the traveling direction detected by said traveling direction detector is wrong by making said light-emitting element light up in a specific color out of said plurality of colors, and said direction notifier notifies said direction to go by making said light-emitting element light up in a color other than the specific color out of said plurality of colors.

2. A mobile communication terminal according to claim 1, further comprising a route determiner which determines whether or not said present location is off the route designated by said navigation function, wherein
 said direction notifier includes a route existing direction notifier which notifies a direction in which the route exists designated by said navigation function when said route determiner determines to be off the route designated by said navigation function.

3. A mobile communication terminal according to claim 2, wherein
 said route existing direction notifier includes a route existing direction calculator which calculates a direction in which the route exists designated by said navigation function from said present location and the traveling direction detected by said traveling direction detector.

4. A mobile communication terminal according to claim 2 or claim 3, wherein said direction notifier further includes a route direction notifier which notifies the direction of the route designated by said navigation function when said route determiner determines not to be off the route designated by said navigation function.

5. A computer readable non-transitory storage medium readably storing a notifying program in a mobile communication terminal having a navigation function to perform route guidance from a present location to a destination by obtaining information of the present location, said notifying program causes said computer to execute:
- a traveling direction detecting step which detects a traveling direction of said mobile communication terminal;
- a determining step which determines whether or not the detected traveling direction is coincident with a direction of a route designated by said navigation function; and
- a notifying step which notifies by a visual effect at least one of whether or not the detected traveling direction is correct on the basis of said determining step, wherein said notifying step further notifies that the traveling direction is wrong by a color when said determining step determines that the traveling direction is not coincident with a direction of a route designated by said navigation function;
- wherein said notifying step further notifies a correct direction to go by a color when said determining step determines that the traveling direction is wrong, and
- wherein said mobile communication terminal further includes one light-emitting element capable of lighting up in a plurality of colors, and said notifying step further notifies that the detected traveling direction is wrong by making said light-emitting element light up in a specific color out of said plurality of colors, and said notifying step further notifies said correct direction to go by making said light-emitting element light up in a color other than the specific color out of said plurality of colors.

6. A notifying method in a mobile communication terminal having a navigation function to perform route guidance from a present location to a destination by obtaining information of the present location, including steps of:
- a traveling direction detecting step which detects a traveling direction of said mobile communication terminal;
- a determining step which determines whether or not the detected traveling direction is coincident with a direction of a route designated by said navigation function; and
- a notifying step which notifies at least one of whether or not the detected traveling direction is correct on the basis of said determining step by a visual effect, wherein said notifying step further notifies that the traveling direction is wrong by a color when said determining step determines that the traveling direction is not coincident with a direction of a route designated by said navigation function;
- wherein said notifying step further notifies a correct direction to go by a color when said determining step determines that the traveling direction is wrong, and
- wherein said mobile communication terminal further includes one light-emitting element capable of lighting up in a plurality of colors, and said notifying step further notifies that the detected traveling direction is wrong by making said light-emitting element light up in a specific color out of said plurality of colors, and said notifying step further notifies said correct direction to go by making said light-emitting element light up in a color other than the specific color out of said plurality of colors.

7. A mobile communication terminal according to claim 1, wherein said error notifier notifies, when said determiner determines not to be coincident, that said determiner determines not to be coincident by the color different from a color by which notifies that said determiner determines to be coincident.

* * * * *